DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 14, 1972

896 O.G. 421

T896,025
CONTROLLED FOAM DETERGENT FORMULATION

Paul Sosis, Fair Lawn, N.J., and Richard D. Katstra, Englewood, Calif., assignors to Continental Oil Company, Ponca City, Okla.

Filed Jan. 27, 1971, Ser. No. 110,344
Int. Cl. C11d *1/831*
U.S. Cl. 252—121
No Drawing. 13 Pages Specification

A controlled foam detergent formulation containing ethoxylated nonionic surfactants, sodium linear alkylbenzene sulfonates, and a foam modifier, such as a linear fatty acid containing less than five percent $C_{20}$ component in the fatty acid carbon chain of $C_{16}$ to $C_{22}$.